United States Patent [19]

Kurihara et al.

[11] Patent Number: 5,378,489
[45] Date of Patent: Jan. 3, 1995

[54] EMULSIFIED TASTE-MODIFIER COMPOSITION

[75] Inventors: Yoshie Kurihara, 7-4-7, Okuzawa, Setagaya-ku; Hiroshige Kohno; Hiromu Sugiyama; Teiyu Shimada; Masako Saito; Takeaki Akabane, all of Tokyo, Japan

[73] Assignees: Yoshie Kurihara; Asahi Denka Kogyo Kabushiki Kaisha, Tokyo, Japan

[21] Appl. No.: 161,204

[22] Filed: Dec. 2, 1993

Related U.S. Application Data

[63] Continuation of Ser. No. 916,593, Jul. 20, 1992, abandoned.

[30] Foreign Application Priority Data

Aug. 2, 1991 [JP] Japan .................. 3-194515

[51] Int. Cl.6 .............................. A23L 1/221
[52] U.S. Cl. ..................... 426/602; 426/615; 426/650
[58] Field of Search ............... 426/615, 602, 650

[56] References Cited

U.S. PATENT DOCUMENTS 3,615,718 10/1971 Weinstein ............ 426/565 X
3,968,266 7/1976 Baugher ............... 426/566
4,421,778 12/1983 Kahn et al. ............ 426/565 X

FOREIGN PATENT DOCUMENTS 0351566 1/1990 European Pat. Off. .
0351567 1/1990 European Pat. Off. .
0458307 11/1991 European Pat. Off. .
3-190899 8/1991 Japan .

OTHER PUBLICATIONS

Patents Abstracts of Japan vol. 275, No. 14 (C–728), 14 Jun. 1990; & JP-A-2084161 (Yoshie Kurihara et al.) 16 Mar. 1990 *abstract*.

Primary Examiner—Joseph Golian
Attorney, Agent, or Firm—Frishauf, Holtz, Goodman & Woodward

[57] ABSTRACT

The emulsified taste-modifier composition of the present invention comprises *Curculigo latifolia* fruits, processed *Curculigo latifolia* fruits or a component containing curculin obtained therefrom, an emulsifier, an aqueous phase and a fat component.

1 Claim, No Drawings

EMULSIFIED TASTE-MODIFIER COMPOSITION

This application is a continuation of application Ser. No. 07/916,593, filed Jul. 20, 1992 (abandoned).

BACKGROUND OF THE INVENTION

1. Field of the Invention

This invention relates to a taste-modifier composition whereby *Curculigo latifolia* fruits, processed *Curculigo latifolia* fruits or a component containing curculin obtained therefrom can stably and effectively exert a taste-modification activity.

2. Description of the Prior Art

The present inventors formerly successfully extracted and purified curculin, which is a protein having a taste-modification activity, from *Curculigo latifolia* fruits belonging to the family Curculigo or to the genus Curculigo of the family Amaryllidaceae and formulated the curculin into a preparation (refer to Japanese Patent Laid-Open No. 104263/1990).

SUMMARY OF THE INVENTION

The present inventors further developed a taste-modifier composition, which is prepared by adding one or more substances selected from the group of salts, carbohydrates, organic acids and proteins to *Curculigo latifolia* fruits, processed *Curculigo latifolia* fruits or a component containing curculin obtained therefrom, as well as a method for stabilizing a taste-modifier (refer to Japanese Laid-Open No. 27356/1992).

Although the above-mentioned taste-modifier composition containing curculin has a strong taste-modification effect, this effect cannot be exerted unless the composition is held in the mouth for a long time. Further, there is another problem that composition should be added in a large amount to a food.

When the above-mentioned taste-modifier composition is added to water-based foods such drinks, furthermore, most of the curculin-containing component is not dissolved but forms a precipitate.

The above-mentioned taste-modifier composition containing curculin is dissolved in the presence of a salt of a high concentration. In this case, however, the salt employed in a large amount would deteriorate the flavor of the taste-modifier composition per se. In addition, the intense saltiness undesirably affects the expression of the activity of the taste-modifier composition itself.

Accordingly, it is an object of the present invention to provide an emulsified taste-modifier composition containing curculin which can exert a high taste-modification activity of sustaining and enhancing sweetness, is excellent in the retention of the activity and can be easily added to various foods.

It is another object of the present invention to provide an emulsified taste-modifier composition containing curculin which is further effective in sustaining and enhancing a flavor.

The above-mentioned objects of the present invention have been achieved by providing an emulsified taste-modifier composition which contains *Curculigo latifolia* fruits, processed *Curculigo latifolia* fruits or a component containing curculin obtained therefrom, an emulsifier, an aqueous phase and a fat component.

The emulsified taste-modifier composition according to the present invention shows a potent taste-modification activity and is excellent in the retention of the activity.

The taste-modifier composition of the present invention, which is provided in the form of an emulsion, is further advantageous in that it can be easily added to various foods and exert a potent effect even when added in a small amount.

When added to foods, furthermore, the emulsified taste-modifier composition according to the present invention is effective not only in retaining the sweetness but also in enhancing the flavor.

DETAILED DESCRIPTION OF THE INVENTION

Now the emulsified taste-modifier composition of the present invention will be described in greater detail.

The *Curculigo latifolia* fruits, processed *Curculigo latifolia* fruits or a component containing curculin extracted therefrom are as follows. It is preferable to use a component containing curculin which is extracted with a salt from the above-mentioned *Curculigo latifolia* fruits or processed *Curculigo latifolia* fruits (hereinafter referred to as the salt-extracted curculin). It is still preferable to use the salt-extracted curculin from which the salt used in the extraction has been removed.

As the above-mentioned *Curculigo latifolia* fruits or processed *Curculigo latifolia* fruits, fresh *Curculigo latifolia* fruits and processed ones (for example, grinds of dried or frozen *Curculigo latifolia* fruits or *Curculigo latifolia* sarcocarp purer) may be cited. It is preferable to use *Curculigo latifolia* fruits free from peels and seeds, since no curculin is contained in peels or seeds.

In the present invention, the method for drying *Curculigo latifolia* fruits is not particularly restricted. It is recommended, however, to conduct drying in the shade, cold-drying, freeze-drying, vacuum-drying or drying in a relatively low temperature range therefor.

In the present invention, the method for freezing the above-mentioned *Curculigo latifolia* fruits is not particularly restricted. As the method therefor, slow freezing, rapid freezing and self-freezing may be cited.

In the present invention, the method for grinding the above-mentioned *Curculigo latifolia* fruits is not particularly restricted. It is undesirable, however, to ground seeds distributed in the sarcocarp, since these seeds are rich in oily components.

An example of the component containing curculin obtained from *Curculigo latifolia* fruits or processed *Curculigo latifolia* fruits is the above-mentioned salt-extracted curculin, which may be further purified by, for example, desalting. It is preferable in the present invention to use desalted salt-extracted curculin.

The extraction with a salt may be carried out in accordance with the method described in Japanese Patent Laid-Open No. 190899/1991 by washing *Curculigo latifolia* fruits or processed *Curculigo latifolia* fruits with water to thereby obtain a precipitate and sequentially by extracting the precipitate with an aqueous solution of a salt of a concentration of 0.01M or above.

In the water-washing step, water is added to *Curculigo latifolia* fruits or the sarcocarp and the mixture is then homogenized and centrifuged. The supernatant thus obtained has a dark brown color. To the precipitate thus formed is added water in an amount as large as, or more than the starting fruits or sarcocarp, followed by homogenizing and centrifuging. This water-washing operation is repeated until a colorless supernatant is obtained.

Examples of the salt usable in the extraction include hydrochlorides of sodium, potassium, calcium, magnesium and ammonium, phosphates of sodium, potassium, calcium, magnesium and ammonium, carbonates of sodium, potassium, calcium, magnesium and ammonium, sulfates and sulfites of sodium, potassium, calcium, magnesium and ammonium, nitrates and nitrites of sodium and potassium, lactates of sodium and calcium, alum, burnt alum, sodium acetate, pyrophosphates of sodium and potassium, propionates of sodium and potassium, sodium benzoate, sodium fumarate and polysodium acrylate.

The extraction with an aqueous salt solution may be carried out, for example, as follows. To the precipitate obtained in the above-mentioned water-washing step is added an aqueous solution of sodium chloride, followed by homogenizing and centrifuging or filtering.

The salt-extracted curculin thus obtained may be purified by a common procedure such as concentration, desalting, salting-out or chromatography.

In the present invention, the method for concentration is not particularly restricted. Thus it may be performed with the use of, for example, an ultrafiltration membrane.

Although the method for desalting to be used the present invention is not particularly restricted, it may be preferably effected with the use of, for example, a dialysis membrane, an ultrafiltration membrane or a desalting device. The desalting may be preferably continued at least until the component containing curculin shows no saltiness.

Salting-out may be effected with the use of, for example, ammonium sulfate, sodium sulfate, potassium phosphate, magnesium sulfate, sodium citrate or sodium chloride. Chromatographic purification may be performed by, for example, ion exchange chromatography with CM-Sepharose or molecular sieve chromatography.

The component containing curculin thus obtained is preferably used in a state of being dissolved in water or a saline. The concentration of the curculin solution may preferably range from 0.01 to 10% by weight, still preferably from 0.05 to 5% by weight, in terms of purified curculin.

The term "purified curculin" as used herein means a product obtained by effecting salting out followed by ion exchange chromatography. For example, a curculin product prepared by subjecting a precipitate, obtained through salting out with ammonium sulfate, to ion exchange chromatography with CM-Sepharose may be cited therefor.

The emulsifier to be used in the present invention is not particularly restricted. For example, lecithin, glycerol fatty acid esters, polyglycerol fatty acid esters, sucrose fatty acid esters, sorbitan fatty acid esters, saponin and mixtures thereof may be used therefore.

The aqueous phase to be used in the present invention is not particularly restricted, so long as it can serve as moisture.

The fat component to be used in the present invention is not particularly restricted. For example, flavors, vegetable fats and oils, animal fats and oils and mixtures thereof may be used therefor. Further, processed fats and oils are usable therefor.

The emulsified taste-modifier composition according to the present invention may further contain various seasoning components, phosphates and other components, if desired.

As a phosphate, those having a pH value of 7 or below are preferable. It is particularly preferable to use phosphates of pH 3 to 7. Examples thereof include sodium dihydrogenphosphate (sodium primary phosphate), potassium dihydrogenphosphate (potassium primary phosphate), sodium hydrogenpyrophosphate, potassium hydrogenpyrophosphate, sodium metaphosphate, sodium hexametaphosphate, potassium metaphosphate and potassium hexametaphosphate. It is particularly preferable to use sodium hexametaphosphate, potassium hexametaphosphate, sodium hydrogenpyrophosphate and potassium hydrogenpyrophosphate therefor.

Now one example of the method for producing the emulsified taste-modifier composition according to the present invention will be given.

This composition can be prepared by mixing *Curculigo latifolia* fruits, processed *Curculigo latifolia* fruits or a component containing curculin obtained therefrom, an emulsifier, an aqueous phase together with a fat component, seasonings and other components in a conventional manner so as to give an emulsion. In this step, the type of the emulsion, i.e., either O/W type (oil-in-water type) or W/O type (water-in-oil type), is not restricted.

In the emulsified taste-modifier composition of the present invention, the ratio of the aqueous phase to the fat component and the content of the emulsifier vary depending on the food to which the composition is to be added. In general, the weight ratio of the aqueous phase to the fat component may range from 5/95 to 95/5, while the content of the emulsifier may range from 0.5 to 5% by weight based on the emulsified taste-modifier composition.

The content of *Curculigo latifolia* fruits, processed *Curculigo latifolia* fruits or the component containing curculin obtained therefrom may vary depending on the food to which this composition is to be added. It is needed that at least 1 ppm, preferably 5 to 10,000 ppm of the same, in terms of purified curculin, is contained therein.

To further illustrate the present invention, the following Examples and Comparative Examples will be given.

EXAMPLE 1

To 10 kg of fresh *Curculigo latifolia* fruits was added 20 l of water. Then the mixture was treated on a mixer so as to remove seeds and peels, followed by centrifuging. To the solid matters thus obtained, was added 10 l of 0.5M sodium chloride and the mixture was well stirred and centrifuged. Thus a 0.5M sodium chloride-extract was obtained. To the remaining solid matters, was added 10 l of 0.5M sodium chloride and the above procedure was repeated twice. Thus curculin extracted with the aqueous solution of sodium chloride was obtained.

The curculin extracted with the aqueous solution of sodium chloride was concentrated 15-fold with an ultrafiltration membrane (fractional molecular weight: 20,000) and desalted on a MICRO ACILYZER (ASAHI CHEMICAL IND, CO., LTD). 300 ml of the desalted solution was freeze-dried to thereby give 0.3 g of crude curculin (0.2 g in terms of curculin).

The crude curculin was dissolved in 10 g of water and 100 g of cacao butter and 1 g of polyglycerin polyricinoleate was added thereto. After homogenizing, a W/O type emulsified taste-modifier composition was obtained.

5% by weight of the obtained composition was added to a chocolate of the following formulation and processed in a conventional manner (the content of purified curculin in chocolate: 90 ppm).

TABLE 1

| Formulation of chocolate | |
|---|---|
| Component | Content (% by weight) |
| sugar | 49.56 |
| cacao mass | 30 |
| cacao butter | 20 |
| lecithin | 0.4 |
| vanillin | 0.04 |

Comparative Example 1

The procedure of the above Example 1 was repeated except that the emulsified taste-modifier composition was replaced with sugar to thereby give a chocolate product.

Comparative Example 2

The procedure of the above Example 1 was repeated except that the emulsified taste-modifier composition was replaced with 1% by weight of a dry *Curculigo latifolia* fruit powder to thereby give a chocolate product (the content of purified curculin in chocolate: 100 ppm). 1% by weight in terms of purified curculin is contained in the dry fruit powder.

EXAMPLE 2

1 g of potassium hexametaphosphate was added to 100 ml (0.2 g in terms of purified curculin) of solution prepared by concentrating the desalted solution obtained in the above Example 1 by 3-fold and dissolved therein. Further, 1 g of polyglycerol fatty acid ester, 2 g of vanillin flavor solution and 10 g of soybean oil were homogenized therewith. Thus an O/W type emulsified taste-modifier composition was obtained.

5% by weight of the obtained composition was added to 1 l of a marketed soft cream mix and a soft cream product was produced (the content of purified curculin in soft cream: 90 ppm).

Comparative Example 3

The procedure of the above Example 2 was repeated except that the emulsified taste-modifier composition was replaced with 1% by weight of a dry *Curculigo latifolia* fruit powder to thereby give a soft cream product (the content of purified curculin in soft cream: 100 ppm). 1 % by weight in terms of purified curculin is contained in the dry fruit powder.

Test Example 1

The intensities of the sweetness and flavor of each of the chocolate products produced in the above Example 1 and Comparative Examples 1 and 2, and the taste-modification effects on the sweetness of a highly sour wine, which was taken after these chocolate products had been taken, were examined by ten panelists. Table 2 shows the results.

TABLE 2

Taste-modification effects of chocolates of Example 1 and Comparative Examples 1 and 2

| | Sweetness/flavor intensity (no. of panelists) | | | Sweetness of wine after taking chocolate* |
|---|---|---|---|---|
| | slight | good | very good | |
| Ex. 1 | | 2 | 8 | +++ |
| Comp. Ex. 1 | 10 | | | − |
| Comp. Ex. 2 | 4 | 6 | | + |

*+++: considerably sweet, +: somewhat sweet, −: not sweet at all.

The chocolate produced in the above Example 1 had a refreshing sweetness and an enhanced rich flavor of cacao and vanillin. When a highly sour wine was taken after this chocolate had been taken, the wine tasted as sweet as a fruit juice.

Test Example 2

The intensities of the sweetness and flavor of each of the ice cream products produced in the above Example 2 and Comparative Example 3, and the taste-modification effects on the sweetness of a 20% aqueous solution of lemon juice, which was taken after these ice cream products had been taken, were examined by ten panelists. Table 3 shows the results.

TABLE 3

Taste-modification effects of ice creams of Example 2 and Comparative Example 3

| | Sweetness/flavor intensity (no. of panelists) | | | Sweetness of 20% lemon juice after taking ice cream* |
|---|---|---|---|---|
| | slight | good | very good | |
| Ex. 2 | | 1 | 9 | +++ |
| Comp. Ex. 3 | 2 | 8 | | + |

*+++: considerably sweet, +: somewhat sweet, −: not sweet at all.

The ice cream produced in the above Example 2 had an enhanced vanillin flavor. When a 20% aqueous solution of lemon juice was taken after this ice cream had been taken, the sugar-free lemon juice tasted sweet.

What is claimed is:

1. An emulsified taste-modifier composition comprising *Curculigo latifolia* fruits, processed *Curculigo latifolia* fruits or a component containing curculin obtained therefrom in an amount of 5 to 10,000 ppm based on curculin content, an emulsifier, an aqueous phase and a fat component, wherein the content of said emulsifier ranges from 0.5 to 5% by weight based on said emulsified taste-modifier composition; the weight ratio of the aqueous phase to the fat component ranges from 5/95 to 95/5 and the emulsifier is polyglycerin polyricinoleate.

* * * * *